United States Patent
Bostanci et al.

(10) Patent No.: US 7,092,835 B2
(45) Date of Patent: Aug. 15, 2006

(54) PROCESS AND SYSTEM FOR THE DESCRIPTION AND EXECUTION OF AUTOMATED TESTS

(75) Inventors: Erkan Bostanci, Bielefeld (DE); Klaus Lamberg, Paderborn (DE); Rainer Rasche, Paderborn (DE); Jobst Richert, Lippstadt (DE)

(73) Assignee: dspace digital signal processing and control engineering GmbH, Paderborn (DE)

( * ) Notice: Subject to any disclaimer, the term of this patent is extended or adjusted under 35 U.S.C. 154(b) by 33 days.

(21) Appl. No.: 10/923,134

(22) Filed: Aug. 20, 2004

(65) Prior Publication Data

US 2005/0090997 A1   Apr. 28, 2005

(30) Foreign Application Priority Data

Aug. 20, 2003   (DE) ............... 103 38 856

(51) Int. Cl.
*G01D 3/00* (2006.01)
(52) U.S. Cl. .............. 702/108; 702/123; 717/124; 707/3; 715/513; 715/525
(58) Field of Classification Search .......... 702/108, 702/123, 119; 717/124; 707/3; 715/513, 715/525; 703/23
See application file for complete search history.

(56) References Cited

U.S. PATENT DOCUMENTS

2003/0163788 A1* 8/2003 Dougherty .............. 715/523
2005/0187916 A1* 8/2005 Levin et al. ............. 707/3
2005/0257198 A1* 11/2005 Stienhans et al. ........ 717/124

* cited by examiner

*Primary Examiner*—John Barlow
*Assistant Examiner*—Hien Vo
(74) *Attorney, Agent, or Firm*—Joseph A. Calvaruso; Chadbourne & Parke LLP

(57) ABSTRACT

The invention involves a process and system for testing a technical system, such as an electronic control devices. The system includes a data processing system for executing a test sequence stored in memory. The data processing system communicates with the technical system via an interface. Data is transmitted by the executed test sequence to the technical system and/or read by the technical system. The test sequence for executing a test may be graphically displayed. The test sequence may be composed of executable program blocks in a graphical hierarchic arrangement, wherein a simultaneous execution of program blocks of the same hierarchal level can be determined by graphically arranging the program blocks adjacent to one another, and by executing program blocks of a different hierarchic level subsequently one after the other, by graphically arranging the latter among each other in the display.

24 Claims, 7 Drawing Sheets

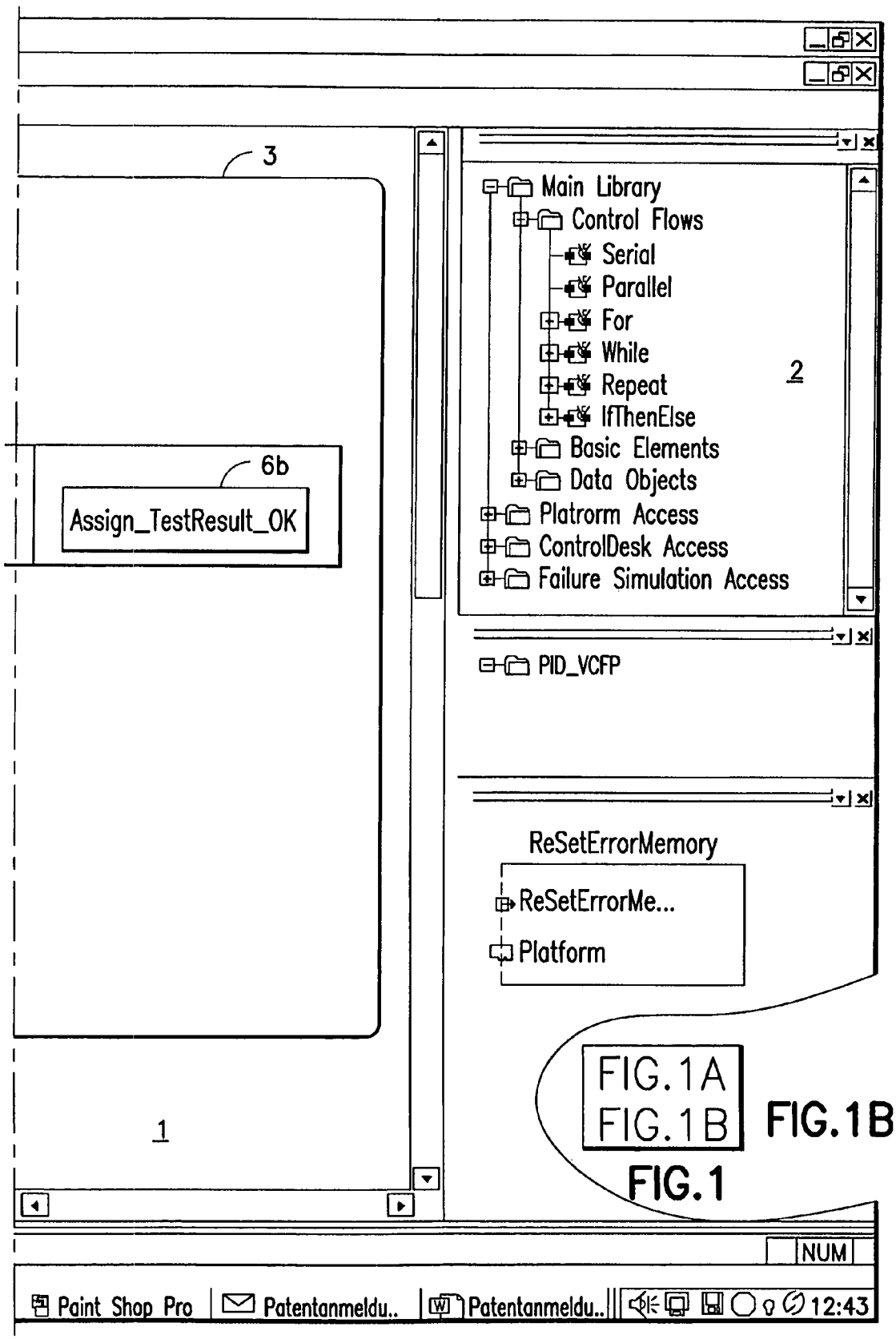

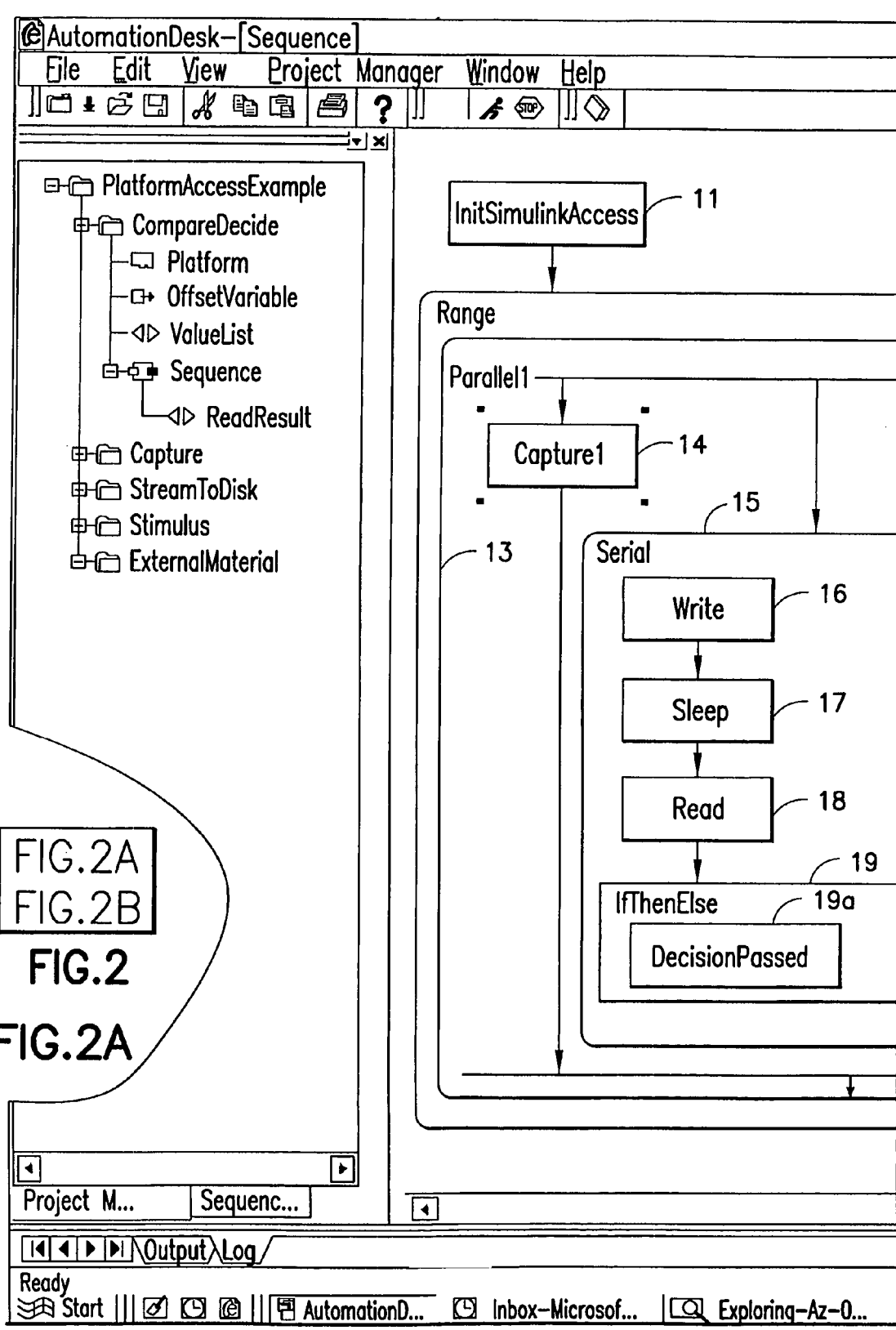

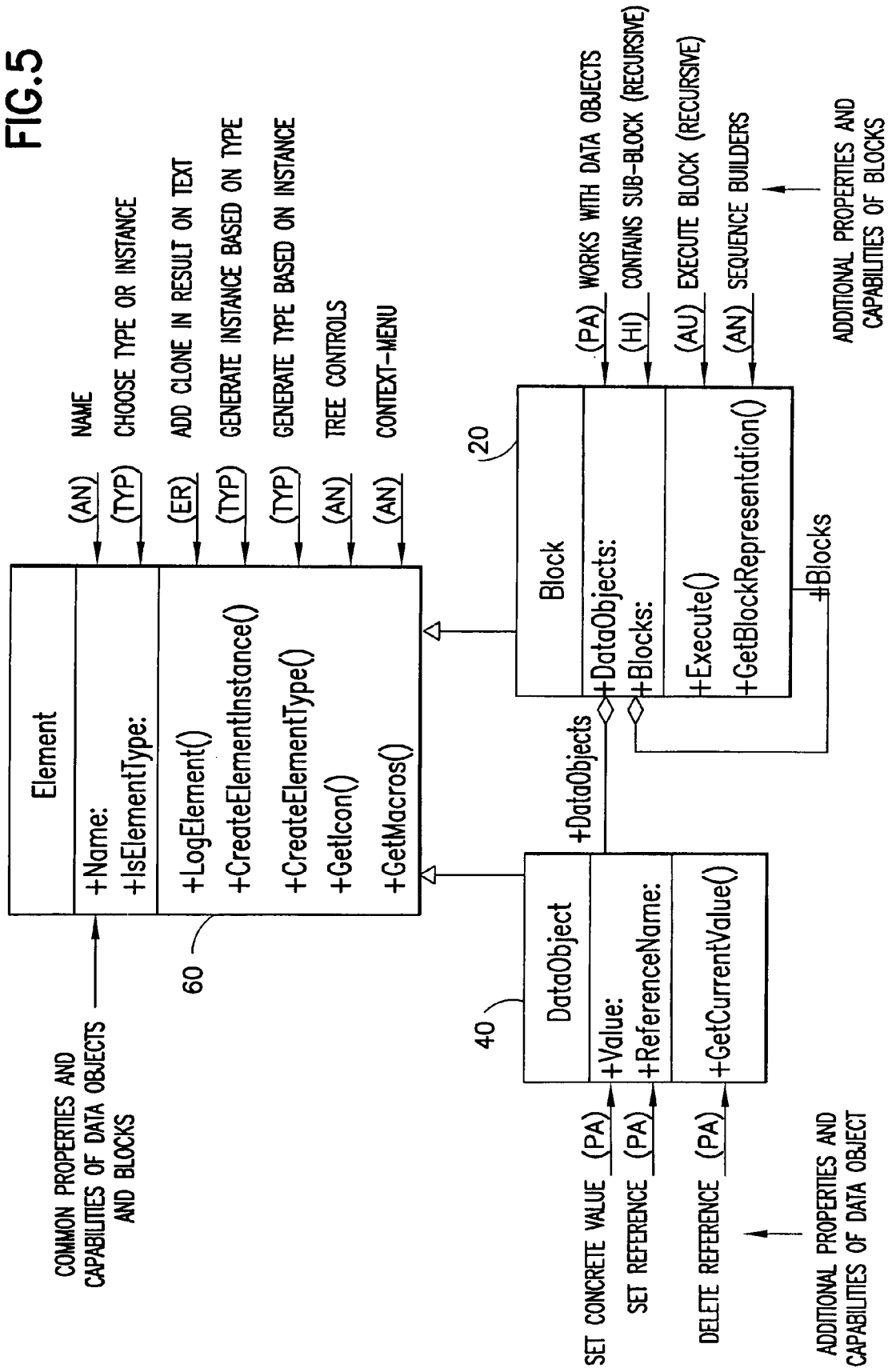

PROCESS AND SYSTEM FOR THE DESCRIPTION AND EXECUTION OF AUTOMATED TESTS

The invention relates to a process and a system for testing at least one technical system, in particular an electronic control device, comprising at least one data processing system for executing a test sequence stored in a memory in the form of a program, and a display device, whereby the data processing system is linked with the technical system via at least one interface, and data are transmitted by means of the executed test sequence to the technical system and/or read by the latter, and whereby the test sequence for executing a test is graphically represented on the display device.

Technical systems of the type employed, for example in motor vehicles, currently often comprise electronic components for controlling and/or regulating the technical system. Such electronic components are referred to as electronic control units, or ECU's.

Before such a control unit is manufactured in series, it is subjected to comprehensive tests. Such tests particularly simulate the technical environment in which the control unit is later used. For example, for testing an electronic control unit for controlling/regulating the electronics of an engine, various driving conditions can be simulated that conform to the later circumstances in reality.

The more complex the technical system, the more application cases and scenarios may occur and have to be simulated for testing the reliability of the system in real life.

Such tests generate a considerable amount of data, which ensue from the description of the actual test routines, on the one hand, and from the test results as well, on the other.

In the generation, execution and evaluation of test scenarios, a test system and the executed test procedures are expected to satisfy high requirements with respect to flexibility, transparency and simple manipulation of a test system.

It is known in the prior art that a test system, for example for control devices, comprises at least one computer that is linked with a test object, e.g. a control device, via an interface. In addition, computer programs support the user in the description of the user's test scenarios and test objects.

In addition to entirely text-based programming of test scenarios in the form of test scripts, it is known that test systems with interactive, e.g. graphical user surfaces or programming environments are employed as well. Such test systems permit the user to specify his test scenario in the form of a so-called test sequence, which in turn may consist of individual test steps. Test steps are executed according to a defined control flow.

Preset conditions often have to be satisfied in order for a test step to be executed. The more complex a test scenario, the more conditions, loops, sequential routines, parallel routines or the like have to be managed in the generation of the test project. By the same token, on the side of the test results, this raises the complexity for managing all kinds of different test results.

As the number of technical systems, e.g. of control devices increases within an overall system, conventional test systems, for example in a motor vehicle, are often not suitable for generating the test sequences for a test scenario. The known systems lack clear and intuitive generation, execution and representation of the test results and the test program, or the test sequences.

The task of the invention is to render high complexity in the generation of test scenarios, for example within a group of control devices, manageable.

The task is resolved by a process and a system, in which a test sequence is composed of executable program blocks, whereby the execution sequence of individual program blocks is determined by a data processing system by means of a hierarchic graphical arrangement of the program blocks in the display device. The simultaneous execution of program blocks of like hierarchic level is determined by graphically arranging such blocks one next to the other in the display device, and by arranging program blocks disposed on a different hierarchic level by graphically arranging the latter one next to another for the subsequent execution of such program blocks.

Such a solution as defined by the invention affords an integral and hierarchic view of all steps of the test, their sequence, as well as the applicable data of a test scenario.

Identical hierarchic levels have, for example, conditions that may lead to conditioned branching in the execution of the test program or test sequence.

It is advantageous if the execution of a program block is determined within a program block in the display device by graphically arranging the program blocks one in another.

In order especially to organize the data associated with a test scenario in a clear manner, and to assign such data, for example to a program block as parameters, provision may be made for allocating to a program block at least one data object particularly through a graphical arrangement. This permits graphic parameterization as well. Program blocks may thus be present in the programmed test environment to which a data object has been assigned, as well as program blocks to which no data object has been assigned. A program block having no data object assigned to it may be, for example, a simple print instruction for displaying a fixed test on the screen. Such an instruction requires no parameterization.

A data object may preferentially comprise the data required for a test and/or contained in a test, and/or may refer to another data object. For example, with the same data in different program blocks, it is not always necessary to allocate a complete data object in each case; but referencing addressing suffices.

In this way, project hierarchies can be formed from program blocks permitting the inclusion and management of test sequences, data objects and results, whereby data objects will orient themselves on the blocks of the project hierarchy, thereby permitting and hierarchic parameterization.

Through parameterization of a program block, e.g. through one or more data objects, it is possible to form complete modules which, in addition to an executable program block, comprise also the data and parameters required for the execution. According to the invention, a program block and/or data object each may be viewed as a program element that is at least in part forming a component of a test or test sequence to be executed. In this connection, the properties and capabilities, for example, of a program block or data object may be retained in a program element in an abstract manner.

Therefore, a test system as defined by the invention may be composed of different program elements, i.e. program blocks and/or data objects comprising, for example their own capabilities of representation in a display device, as well as of parameterization, execution, recording of results, hierarchic configuration, formation of type and instance, and thus permit the aforementioned integral and also hierarchic view of complex test scenarios.

Benefits ensue in this way in the form of a more rapid build-up of complex test projects with the test sequences contained therein, through simpler parameterization and a clear overall hierarchic representation of the test projects, and the flow of control within the test sequences.

The desired tests can be completely specified by defining executable (test) blocks and the required (test) data (data objects). In this connection, the data objects serve, for example, for supplying starting data material such as administrative data for specifying the date, time, author, remarks, suggestive data, data relating to the control of the test routine, etc.

The program blocks each possess specific "imprints" and serve for specifying administrative or structuring units (e.g. a test project or test folder as a grouping element within test projects), on the one hand, and for the specification of program blocks within the test sequences (e.g. specification of the flow of control within their specific "imprints" for parallelism, sequential routines, conditions, loops, or similar features), on the other hand. In addition, the program blocks are employed in specific blocks as test steps, and possess an algorithmic and thus a mathematical behavior vis-à-vis processing such as, e.g. reading, amending, writing etc. of the data.

The tests to be executed, consisting of the program blocks and data objects, should preferably offer the capabilities of display, parameterization, execution, recording of results, hierarchic configuration, and typification.

This is particularly achieved by combining the properties and capabilities of data objects and program blocks in an abstract program element, from which the program blocks and data objects inherit and possess additional specialized properties and capabilities. For example, a program element, i.e. a program block or a data object may possess, for example the capability of representation in a tree configuration and thus, for example the capability of supplying a specific icon; representation of the name and of context menus for accessing defined actions of the element (e.g. execution; opening of an element-specific dialogue).

Likewise, provision can be preferably made for the capability of a program element, in particular of a program block for recording the result (clone formation) in a defined context. For this purpose, a tree of results can be generated in the course of execution which represents the hierarchic and time sequence of the program routine according to the control flow. In particular, a program element may generate a copy and/or representative of itself and insert it in the tree of results. Such a tree of results may represent a type of element-based log file, which affords the user a possibility for controlling the routine of a test sequence because such a tree reproduces the block hierarchy of the test sequences and represents the executed control flow together with the data objects employed in the given case. The recording of results takes place as a test sequence is being executed, and can be stored in the course of execution on the fixed disk. In another embodiment, provision may be made for a capability of forming a type and instance of a program element. This means that a program element may exist either as a type, e.g. in the sense of an original, template, or building specification, or as an instance, e.g. in the sense of a concrete test application.

A program element may feature the capability of generating in the case of a type a corresponding instance. Vice versa, the instance may feature capability of generating a corresponding type for incorporation in a library, e.g. for the purpose of reuse. Therefore, a program element is preferably storable in a library and/or retrievable from the latter.

For this purpose, the test system preferably comprises a graphical programming environment with which the one or more test sequences can be composed of executable program blocks, on the one hand, whereby the sequence of execution of individual program blocks by the data processing equipment can be determined through a hierarchic graphical arrangement of the blocks in the display device, in connection with which provision is made for at least two different sections, namely a library section and an instance section, on the other hand, whereby the latter is comprising, for example the complete test project including the executable tests or steps of the tests contained therein.

Furthermore, each instance may possess the capability of being synchronized with an applicable library element. Such assignment is defined by a reference of the instance (i.e. of the data object or program block) to the applicable library element. Through such synchronization, the instance is actualized or rebuilt according to the corresponding library element (building specification). Such synchronization may take place recursively as well, i.e. an instance possessing a reference to a library element may in turn contain program blocks and data elements each possessing references to library elements, etc.

Such a mechanism of instance formation (application of library elements for the purpose of test specification) and type formation (incorporation of program blocks and data objects as components of the test specification) can be referred to as typification. A special feature of such typification is that by exchanging the libraries with subsequent synchronization, it is possible to convert an existing test project into an entirely different test system.

For example, the project structure and predominant part of the test specifications for two vehicles A and B may be the same. Differences may exist within individual test blocks for the vehicle variations A and B, which are stored as library elements in different libraries (each for vehicle A and vehicle B). The test project has to be built up only once (e.g. for vehicle A). By exchanging the libraries and subsequent synchronization, it is possible to switch over the test project to the appropriate vehicle, that is to another vehicle type, i.e. for example, switch over the test project to vehicle B.

The position of the library may be either global, i.e. overriding the project, or local, i.e. libraries may be disposed within the administrative program blocks subdividing the project (e.g. within the test project or within test folders), and thus define only local areas of validity and visibility for the library elements. Some differences exist between data objects and executable program blocks. These differences are described in the following in greater detail.

A data object may feature the capability of packing data (values, configurations); the capability of packing references; and the capability of erasing references.

On the one hand, a data object may locally pack concrete words (e.g. numerical values, lists, and fields for signal paths as cause for interference; information about the elimination of short-circuits; configurations of communication interfaces).

On the other hand, the data object may specify at least one suitable reference data object. If such referencing is available, the reference of data from the reference data object is preferred over the reference of local data.

For this purpose, the data object possesses the capability of dissolving said reference and thus access the data of the reference data object.

Furthermore, a data object inherits all capabilities and properties of a program element. The special feature of this setup is that data objects (as test data) may also be completely subject to the typification setup of the program block described above. Therefore, data objects, e.g. test data such as suggestions, signal paths etc., can be employed as reusable library elements.

Through further specialization, a data object may possess generic properties and capabilities of the data object, and beyond that user-specific properties and capabilities (e.g. user-specific data contents and data formats; user-specific dialogues for representing such data contents and data formats; user-specific context menus as capability for accessing user-specific dialogues, and user-specific icons).

A program block may feature an aggregation of data and the capability of executing the latter and of working with such data, and can accommodate additional blocks (aggregation), which leads to hierarchic configuration and supply specific control flow specifications, e.g. through block representation for sequential or parallel execution of program blocks.

The program block offers the possibility of accommodating (aggregating) data. In the widest sense, its function is to work with said data in the course of execution, i.e. to read, amend and, if need be, re-specify such data.

In addition, the block offers the possibility of receiving (aggregating) additional blocks. Thus the build-up of hierarchic and also recursive block or test structures is feasible. The specific setup of aggregation entails specification of the execution (control flow), e.g. sequential, parallel, repeated or conditioned processing as well.

A program block may be expanded via the generic properties and capabilities of the program block by user-specific properties and capabilities (e.g. user-specific algorithms for execution; user-specific visualization (icon); user-specific dialogues).

By virtue of the capability of defining user-specific program blocks, user-specific test projects can also be formulated that possess their own semantics in the sense of the expanded user-specific properties and capabilities. Thus it is possible to formulate user-specific types of test projects that feature, for example data objects defined in a fixed manner, and that have their own user-specific dialogues and user-specific consistency test methods, as well as user-specific methods of test execution.

The tests programmed by means of the method as defined by the invention and/or with a system as defined by the invention are to be executed automatically and influence the assigned hardware in the course of execution, and particularly simulate the conditions of application. For this purpose, it is possible, for example to eliminate interference signals and errors, or to read-in physical errors via a sensor system. Programming of short-circuits, interruptions, excess voltages etc. is feasible.

The test system as defined by the invention permits the generation of a test project with a substructure of the project that defines what is to be tested and where jointly employed data are used. It is possible to set up test sequences and to define the latter through hierarchic representation of the control flow.

It is advantageous that the test engineer is able to apply his cognition and intuition in the development of the test in a targeted manner for solving the task of the test, whereby the test system offers relief in routine work such as the storing and organizing of data and tests and test results on the fixed disk or in the memory. The data are automatically physically organized on the fixed disk or in the memory of the data processing system according to structures proposed and set up in the test system.

In the generation of tests, the user can execute individual steps and thus eliminate individual interference signals and errors in the tested objects.

Exemplified embodiments of the invention are shown in the following figures, in which:

FIG. 5 is a representation of different and common properties of program blocks and data objects.

Figure 1A:
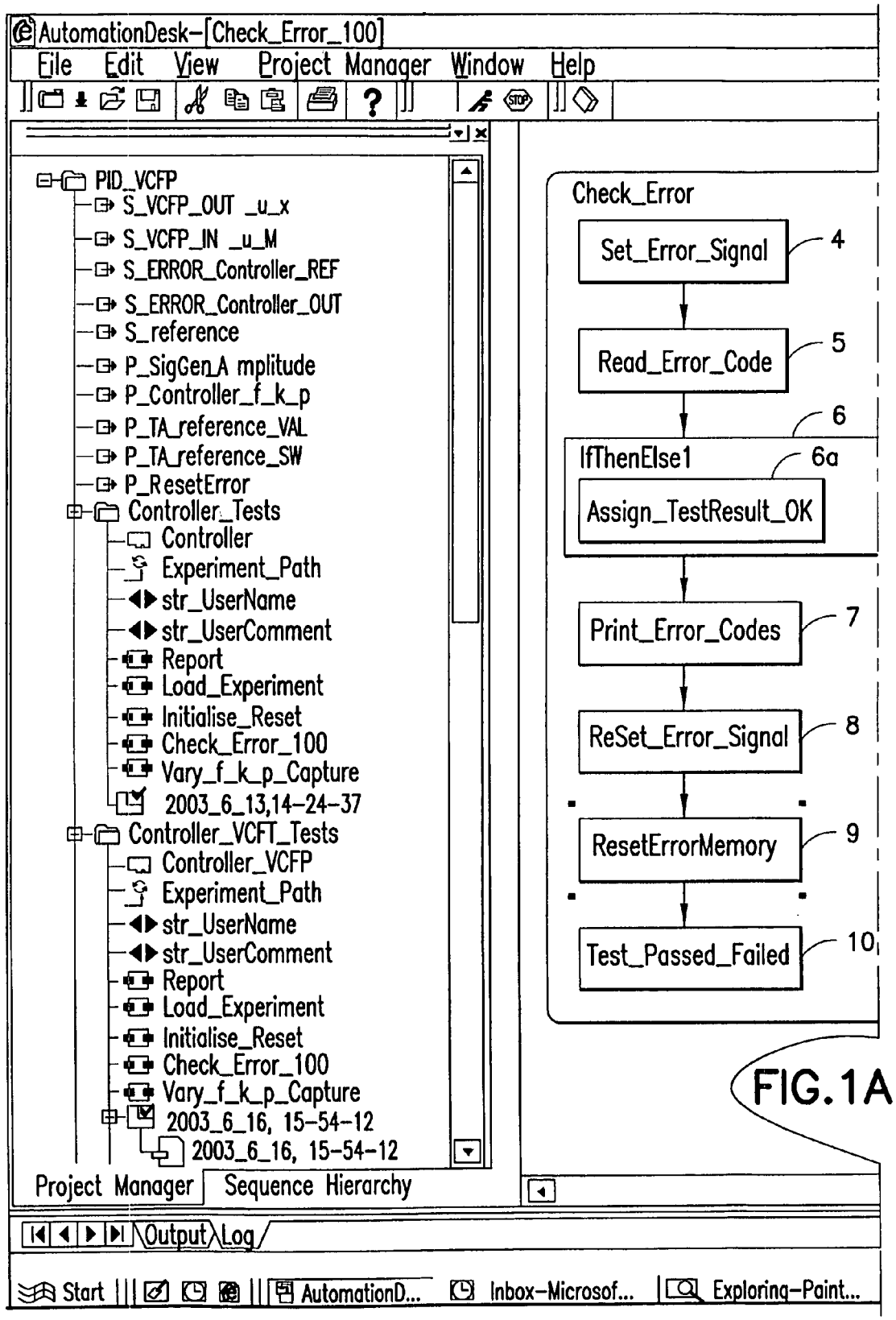
FIG. 1 is a display screen representation of a programming environment for executing the process according to the invention with a sequential control flow.

FIG. 1 shows by way of example a representation of a programming environment on the display screen of a data processing system for executing the process according to the invention. It is shown that the display screen is divided in a number of sections. The instance section 1 and the library section 2 are important for the understanding of the invention. In the present case, the library section is global, but (as described above) may also be local, i.e. located within a hierarchic plane of the project.

The library section 2 shows, for example a main library, which is further divided in a folder "control flows", in which program blocks of different types are stored, e.g. for defining different control flows. For example, program blocks are present for generating a serial, parallel or conditioned control flow.

The instance section 1 shows the graphical hierarchic representation of a control flow, whereby the execution of the programmed test or test sequence is determined by the graphical representation in the instance section 1. The test sequence graphically shown in the instance section 1 can be executed for that purpose.

In the instance section 1, a substantially sequential routine for error testing is shown by way of example. The programmed test routine is composed of a hierarchically superset program block 3 "Check-Error", which in turn is comprised of a plurality of additional program blocks 4 to 10. This shows that a number of additional program blocks can be aggregated in a program block.

The program blocks 4 to 10 are sequentially processed, i.e. one after the other based on their graphical arrangement within the program block 3, whereby within the program block 6, which contains a condition, two additional program blocks 6a and 6b are contained, which are executed depending on the fulfillment of the condition. The two program blocks 6a and 6b are hierarchically equivalent and therefore arranged in the representation one next to the other.

A programming job for a user can be simply accomplished in such a way that object-oriented drag-and-drop pre-configured program blocks are removed with the mouse from the library in library section 2 and placed in the instance section 1. The sequence in which the program blocks are executed is determined here by the graphic arrangement in the instance section 1. In this process, the data objects of the new instance so formed can be newly occupied (i.e. accept new values or references). This pertains to the data objects of the uppermost hierarchic level of said newly formed instance. The data objects within the newly formed instance, thus within lower hierarchical levels, cannot be changed in the instance section because they were defined by the library element allotted thereto. Vice versa, a type can be formed for the user in a simple manner by placing program blocks object-oriented by drag-and-drop, from the instance section 1 into the library section 2, using the mouse.

Figure 2B:
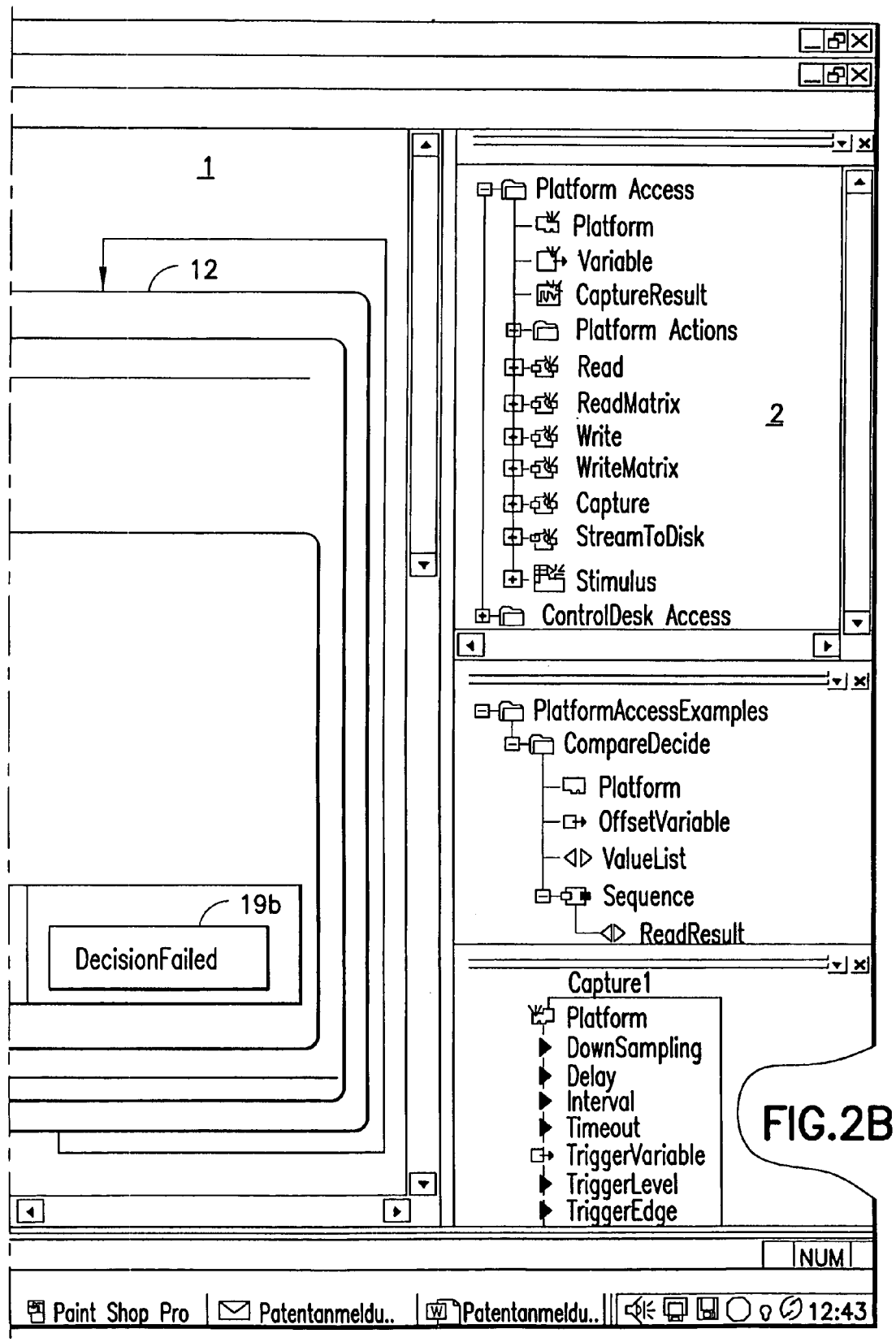
FIG. 2 is a display screen representation of a programming environment for executing the process according to the invention with a parallel control flow.

FIG. 2 shows substantially the same representation of the instance section 1 and library section 2, whereby in the instance section 1 shown here, a routine with a sequential and parallel sequence was programmed by graphical hierarchic arrangement.

As shown in FIG. 2, provision can be made with general validity for all possible embodiments that a program block of a defined type is opened in the instance section that defines the execution of the additional program blocks contained therein without the user being required to fix the execution for each additional program block.

For example, a program block, e.g. of the "parallel" type as denoted in FIG. 2 by reference numeral 13, can be opened, so that all further program blocks inserted within said program block, in the present case for example the program blocks 14 and 15, are automatically graphically arranged one next to the other for parallel execution.

Likewise, it is valid in general that a program block, e.g. of the "serial" type as denoted in FIG. 2 by reference numeral 15, can be opened, so that all further program blocks inserted in said block 15, in the present case for example the blocks 16 to 19, are automatically arranged among each other for serial execution.

Therefore, by specifying for a program block a type, it is possible to define how program blocks disposed on lower hierarchic levels are to be executed.

Referring to FIG. 2, this entails that starting with a program block 11 "InitSimulinkAccess", the program block 12 "Range" is executed subsequently, with the program block 13 "Parallell" being executed within said block "Range".

A parallel execution of the program blocks 14 and 15 takes place within the program block 13, whereby the program block 15 itself features a sequence consisting of the program blocks 16 to 19, of which the program block 19 contains a condition and thus two hierarchically equivalent program blocks 19a and 19b arranged one next to the other.

In the present case, the block 12 and the sub-structured program blocks 13 to 19 contained therein, are executed as long as a preset value, which is imparted, for example by a data object not shown, is located within the defined "Range" section. The program block 12 thus represents a loop with a "discontinue" condition.

In the present case as well, programming can take place in a object-oriented manner by retrieving corresponding program block types from the library and inserting them in the library section 2, so that the program instance shown in the instance section is formed by the types.

Vice versa, the pre-programmed instance as shown in the instance section 1 can be converted into a "program block types" instance and stored in the library, for example for later reapplication.

A data object allocation can take place, e.g. graphically as well, for example by the user clicking with the mouse a program block represented by a box, which opens a context window or context menu in order to specify the variables typical of a program block. For example, for the program block 12, it is possible for the user to specify the range of values in "Range". Likewise, parameterization of the conditions is feasible in this manner in the condition program block 19.

Figure 3:
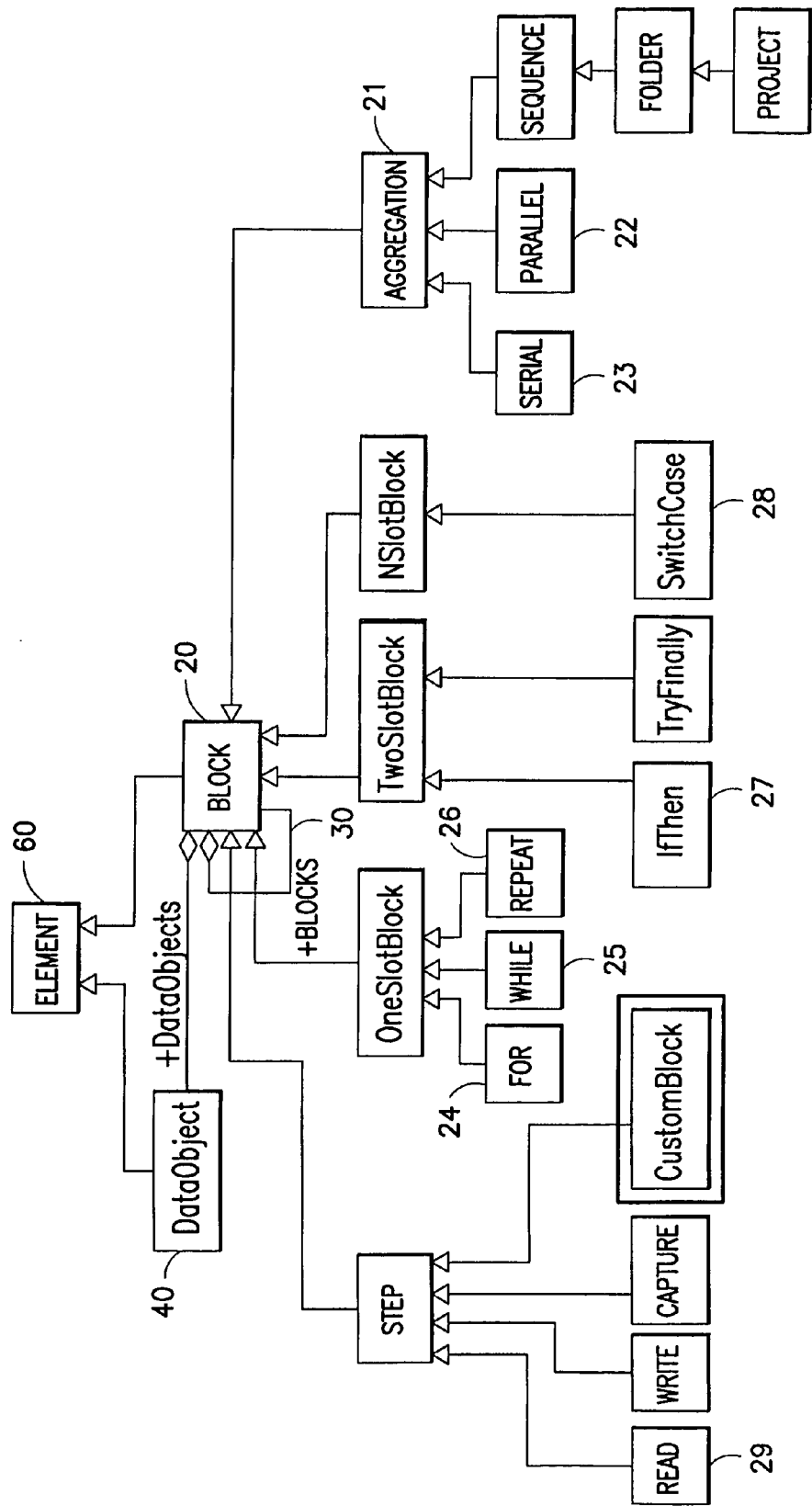
FIG. 3 shows the specific configuration of a program block.

FIG. 3 shows various configurations of the program blocks. The program block 20 and the data object 40 will be seen to form the program elements 60. A program block 20 may contain the data objects 40. The blocks 20 may contain an aggregation 21 of additional blocks, e.g. an arrangement 22 of additional parallel blocks or an arrangement 23 of additional serial blocks.

Furthermore, the program blocks 20 may also feature a category, according to which a varying number of additional blocks so-called slots are arranged hierarchically one next to the other. The control flow routine may be distributed within such a block in equal slots and thus equivalent other blocks depending on the condition.

The blocks 20, which comprise only one additional block, are, for example the loops For 24, While 25 and Repeat 26. Blocks 20 with two equivalent blocks are, for example the condition blocks 27. Any desired number of equivalent blocks may be arranged in the blocks 28, being processed depending on the condition.

Likewise, provision can be made for blocks 20 that execute only one individual step such as, for example polling of a measuring output 29.

The automatic chaining or referencing address 30 clearly shows that a block 20 may comprise, furthermore, several blocks of a different type.

Figure 4:
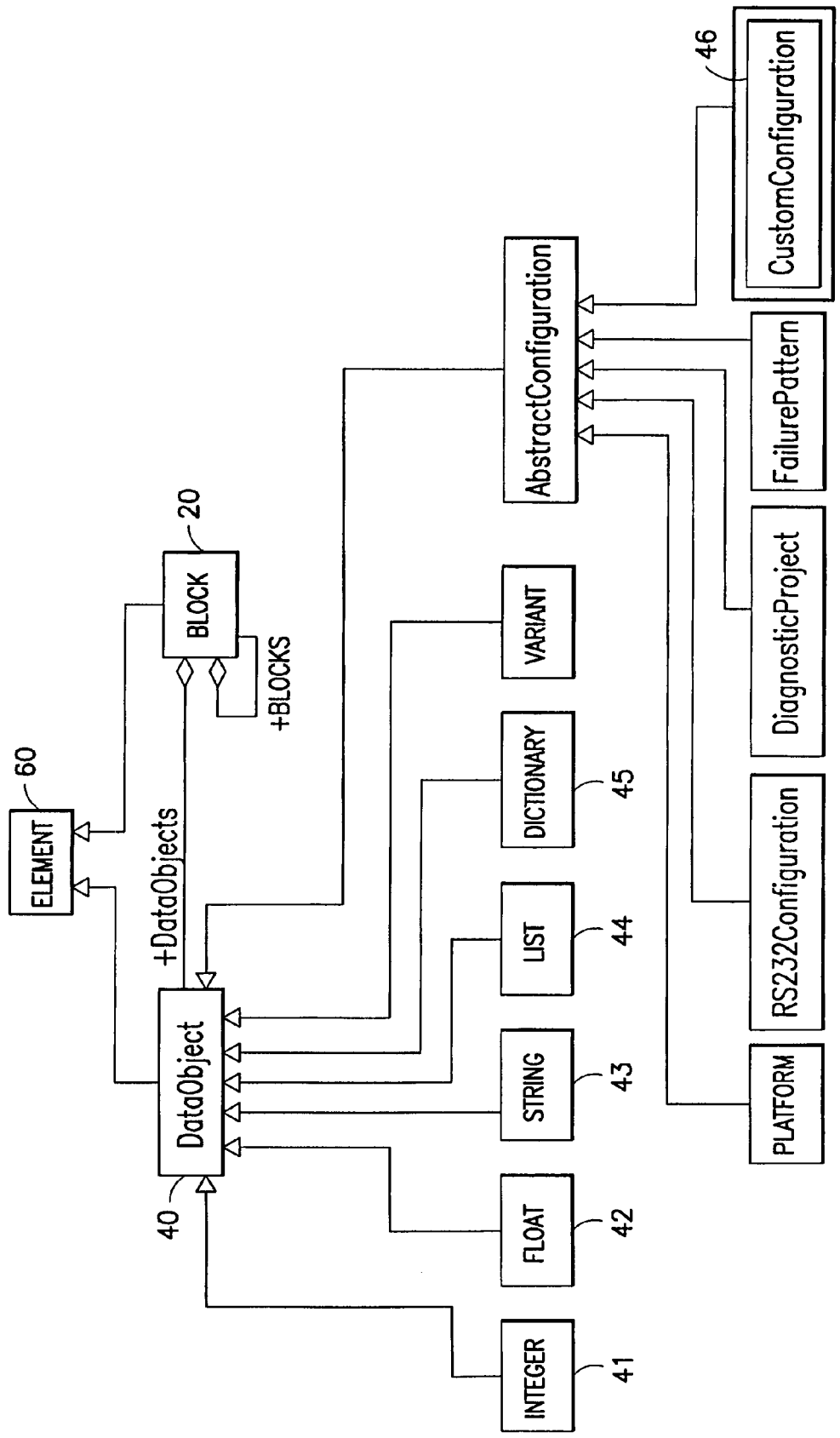
FIG. 4 shows the specific configuration of a data object.

FIG. 4 shows by analogy specific configurations of the data objects 40 that a program block 20 may contain.

In the general case, data objects define value variables such as, for example the integer 41, the flow comma variables 42, the text variables 43, the lists 44, the dictionaries 45, etc. Also, the data objects 40 may be defined externally, e.g. by a user definition 46. Data objects may also define special complex configuration objects, for which own dialogues exist.

FIG. 5 substantially shows the properties of the program blocks 20 or data objects 40. Both belong to the category of the program elements 60, which may feature common properties. For example, it may be specified in such a program element 60 which name it has been assigned; whether an instance or type is involved; and whether the element has the property of generating a copy of itself or a representative, for the latter to be inserted in a tree of results etc., as described above.

According to the property representation, it is clear that a program block 20, furthermore, may have additional properties, e.g. that a program block 20 may contain a data object 40; that a program block may aggregate additional program blocks; and that it is executable and may form a representative for the tree of results.

As an additional property, a data object 40 may define a certain value or assign by reference and may itself form a reference for other data objects.

The invention claimed is:

1. A process for testing a technical system comprising at least one data processing system for executing a test sequence stored in the form of a program in a memory, and a display device, whereby the data processing system is connected to the electronic via at least one interface, and data are transmitted to the technical system by means of the executed test sequence and/or read by said executed test sequence, and whereby the test sequence is graphically displayed on the screen for executing a test, wherein the test sequence is graphically composed of data objects and executable program blocks, whereby by means of a graphical hierarchical arrangement of program blocks, a simultaneous execution of program blocks of the same hierarchical stage is determined by graphically arranging the program blocks next to one another, and executing program blocks of a different hierarchical stage subsequently in time one after the other by graphically arranging them among each other on the screen.

2. Process according to claim 1 wherein the execution of a program block is determined within a program block by graphically arranging the program blocks the one within the other in the display device.

3. Process according to claim 2 wherein at least one data object is subordinated to a program block, in particular through graphical arrangement.

4. Process according to claim 2 wherein a data object comprises data required for and/or contained in a test, and/or refers to another data object.

5. Process according to claim 2 wherein program blocks and data objects each represent program elements forming at least a part of a test or test sequence to be executed.

6. Process according to claim 2 wherein-a program element is storable in a library and/or retrievable from a library.

7. Process according to claim 2 wherein a tree of results is generated in the course of execution of the test sequence, representing the hierarchical succession of the test sequence.

8. Process according to claim 1 wherein at least one data object is subordinated to a program block, in particular through graphical arrangement.

9. Process according to claim 8 wherein a data object comprises data required for and/or contained in a test, and/or refers to another data object.

10. Process according to claim 8 wherein program blocks and data objects each represent program elements forming at least a part of a test or test sequence to be executed.

11. Process according to claim 8 wherein a program element is storable in a library and/or retrievable from a library.

12. Process according to claim 8 wherein a tree of results is generated in the course of execution of the test sequence, representing the hierarchical succession of the test sequence.

13. Process according to claim 1 wherein a data object comprises data required for and/or contained in a test, and/or refers to another data object.

14. Process according to claim 13 wherein program blocks and data objects each represent program elements forming at least a part of a test or test sequence to be executed.

15. Process according to claim 13 wherein a program element is storable in a library and/or retrievable from a library.

16. Process according to claim 13 wherein a tree of results is generated in the course of execution of the test sequence, representing the hierarchical succession of the test sequence.

17. Process according to claim 1 wherein program blocks and data objects each represent program elements forming at least a part of a test or test sequence to be executed.

18. Process according to claim 17 wherein a program element is storable in a library and/or retrievable from a library.

19. Process according to claim 17 wherein a tree of results is generated in the course of execution of the test sequence, representing the hierarchical succession of the test sequence.

20. Process according to claim 1 wherein a program element is storable in a library and/or retrievable from a library.

21. Process according to claim 20 wherein a tree of results is generated in the course of execution of the test sequence, representing the hierarchical succession of the test sequence.

22. Process according to claim 1 wherein a tree of results is generated in the course of execution of the test sequence, representing the hierarchical succession of the test sequence.

23. Process according to claim 1 wherein a program element generates a copy and/or a representative of itself, and inserts the latter in the tree of results.

24. A system for testing another technical systems, comprising at least one data processing system for executing a test sequence stored as a program in a memory, and a display screen, whereby the data processing system is connectable to the technical system to be tested via at least one interface, and data are transmissible to the technical system to be tested by means of an executable test sequence, and/or are readable thereby; and whereby a test sequence for executing a test can be graphically displayed on a screen, wherein the system comprises a graphical programming environment by which the test sequence can be composed of data objects and executable program blocks, whereby by means of a graphic hierarchical arrangement of program blocks, a simultaneous execution of program blocks of like hierarchical stage can be determined by graphic arrangement of program blocks next to each other, and by subsequently executing program blocks of different hierarchical stage, through graphically arranging the program blocks among each other on the screen.

* * * * *